(12) United States Patent
Apichella et al.

(10) Patent No.: US 7,549,864 B2
(45) Date of Patent: Jun. 23, 2009

(54) METHOD AND APPARATUSES FOR TEACHING A METACOGNITIVE APPROACH TO WRITING

(76) Inventors: Sharon L. Apichella, 3510 Kings Hwy., Downingtown, PA (US) 19335; Mary D. Suttton, 117 Shepherds Way, Coatesville, PA (US) 19320

(*) Notice: Subject to any disclaimer, the term of this patent is extended or adjusted under 35 U.S.C. 154(b) by 0 days.

(21) Appl. No.: 10/725,677

(22) Filed: Dec. 2, 2003

(65) Prior Publication Data

US 2005/0069856 A1    Mar. 31, 2005

Related U.S. Application Data

(60) Provisional application No. 60/430,828, filed on Dec. 4, 2002.

(51) Int. Cl.
*G09B 11/00* (2006.01)
(52) U.S. Cl. ..................................... 434/162
(58) Field of Classification Search ............... 434/162, 434/127, 219, 276–279; 446/901
See application file for complete search history.

(56) References Cited

U.S. PATENT DOCUMENTS

| | | | | |
|---|---|---|---|---|
| 3,478,446 A | * | 11/1969 | McCutcheon | 434/407 |
| 3,616,551 A | * | 11/1971 | Conrad | 434/171 |
| 3,903,617 A | * | 9/1975 | Evans | 434/171 |
| 3,928,924 A | * | 12/1975 | Taska | 434/162 |
| 3,940,863 A | * | 3/1976 | Kritzberg | 434/236 |
| 4,173,082 A | * | 11/1979 | Niquette | 434/162 |
| 4,179,833 A | * | 12/1979 | Knodel | 40/633 |
| 4,183,152 A | * | 1/1980 | Harris, III | 434/341 |
| 4,262,431 A | * | 4/1981 | Darnell | 434/170 |
| 4,341,521 A | * | 7/1982 | Solomon | 434/236 |

(Continued)

OTHER PUBLICATIONS

"Plain Hamburger Graphic Organizer" Writers Process Through Authors Study dese.mo.gov/divimprove/curriculum/ModelCurriculum/Polacco/lesson_ three_edite_d.doc, 3.5-3.6.

(Continued)

*Primary Examiner*—Gene Kim
*Assistant Examiner*—Dolores Collins
(74) *Attorney, Agent, or Firm*—John F. A. Earley, III; Frank J. Bonini, Jr.; Harding, Earley, Follmer & Frailey, P.C.

(57) ABSTRACT

An educational method for teaching a metacognitive process for writing is demonstrated within a series of colored, hand-held multiple-shaped manipulatives. Representing a foundation from which all types of writing and its conventions may be explored, the manipulatives have been so designed to aid students in the process of recalling, interpreting, applying, analyzing, synthesizing and/or judging during the writing process. Each part of the manipulatives represent an essential component of the student's thinking during the writing application. The shape, color and key word of each manipulative represents an association for the student in his/her thinking during the process of writing. This innovative educational method has cross-curricula applications and may be taught and personally tailored to address the specific needs of groups or individuals at any age or instructional level In addition, the method and apparatuses provide a diagnostic tool and a form of assessment which can be used by the individual student, collaborating with others and/or the teacher. Freedom of expression, individual writing style and creativity are provided within the theory and application of this invention.

5 Claims, 28 Drawing Sheets

U.S. PATENT DOCUMENTS

| | | | | |
|---|---|---|---|---|
| 4,464,118 | A * | 8/1984 | Scott et al. | 434/85 |
| 4,684,135 | A * | 8/1987 | Bouchal | 273/269 |
| 4,710,979 | A * | 12/1987 | Bull et al. | 2/48 |
| 4,755,141 | A * | 7/1988 | Nakai | 434/258 |
| 4,818,207 | A * | 4/1989 | Heron | 425/289 |
| 4,907,971 | A | 3/1990 | Tucker | |
| 4,986,685 | A * | 1/1991 | Kiyokane | 401/213 |
| 5,013,245 | A | 5/1991 | Benedict | |
| D317,522 | S * | 6/1991 | Hicks et al. | D1/107 |
| 5,114,346 | A * | 5/1992 | Fioramonti | 434/184 |
| 5,219,289 | A * | 6/1993 | Derr | 434/211 |
| 5,277,586 | A * | 1/1994 | Branch | 434/184 |
| 5,306,006 | A * | 4/1994 | Bell | 273/157 R |
| 5,435,726 | A * | 7/1995 | Taylor | 434/128 |
| 5,501,601 | A * | 3/1996 | Todokoro et al. | 434/169 |
| 5,513,991 | A * | 5/1996 | Reynolds et al. | 434/81 |
| 5,738,523 | A | 4/1998 | Wagoner | |
| 5,772,212 | A * | 6/1998 | Hagedorn | 273/299 |
| 5,899,698 | A * | 5/1999 | Sandlin | 434/157 |
| 5,944,312 | A * | 8/1999 | Darneille | 273/157 R |
| 5,945,985 | A * | 8/1999 | Babin et al. | 715/500.1 |
| 6,142,783 | A * | 11/2000 | Rocha | 434/164 |
| 6,234,803 | B1 * | 5/2001 | Watkins | 434/156 |
| 6,402,522 | B1 * | 6/2002 | Gabay et al. | 434/322 |
| 6,551,110 | B1 * | 4/2003 | Hastie | 434/365 |
| 2003/0170600 | A1 * | 9/2003 | Boggs | 434/258 |
| 2004/0173082 | A1 * | 9/2004 | Bancroft et al. | 84/612 |
| 2004/0219964 | A1 * | 11/2004 | Bleckley et al. | 463/13 |
| 2004/0248069 | A1 * | 12/2004 | Palacios | 434/178 |
| 2005/0074736 | A1 * | 4/2005 | Perkins et al. | 434/365 |

OTHER PUBLICATIONS

"Hamburger Writing" Pennsylvania Parent Conference Kit-What About Writing—p. 36 of 64 Laura Small Penn Hills School District, Pittsburgh, PA.

"Homework without Tears for Teachers" Lee Canter & Associates Inc. 1989, p. 153 ISBN#0-06-273132-7.

"What About Writing" Pennsylvania Parent connection Kit -p. 35 of 64 Laura Small Penn Hills School District, Pittsburgh, PA.

"*Adapting the Writing Process*"—Allegheny Intermediate Unit—Designed by AIU Web Development Team.

"*Writing Persuasion Papers: Thesis Statement*"—Department of Linguistics, Brigham Young University -Ashton, Stephanie—Jan. 24, 1998.

"*A Cool Hamburger Joint*"—The Soul Food Café (A non-profit educational site)—Blakely, Heather (2000-2002).

"*Introducing the Hamburger Model for Persuasive Writing*"—Web Lesson Format—Chamber, Bonnie—Mar. 8, 1999.

"*The Hamburger Essay*"—GED 2002 Teachers Handbook of Lessons Plans—Chris DeMitchele of Lee County 2002.

"*The Hamburger Paragraph*"—Georgian Forest Maryland School Website—Diana Kieval—Feb. 5, 1999.

"*How to Write a Hamburger Paragraph*"—Mr. Kligensmith's Online Help Guide—Michael Kligensmith—1996—2003.

"*Hamburger Harley*"—World of Hamburgers, Inc.—Long, Jen—1996-2005.

"*Teaching Writing without Holding the Mayo*"—The National Counsel of Teachers of English—Ousley, Candace.

"*Hamburger Out a Paragraph*"—Power Writing—Moore, Terri & Priscilla Nicholson—Dec. 3, 1998.

"*Turn Students with Learning Disabilities into Writers*"—Council for Exceptional Children, The Voice and Vision of Special Education—Terri, Bonnie—Nov. 10, 2005.

"*Hamburger for Persuasive Writing*"—Persuasion: A Language arts unit for high-ability learners (1998)—Center for Gifted Education. The College of William and Mary College. Dubuque, Iowa: Kendall Hunt Publishing, pp. 68, 300-13 Van Tessel—Baska, K.—J. Hooper & P. Daley Gifted Conference.

"*Teching Ideas*" Mollie Perez—Jun. 2005.

"*Big Mac Paragraph Format*"—www.myworksheets.com.

"Adapting the Writing Process"—Internet Reference—Allegheny Intermediate Unit—Designed by AIU Web Development Team.

"Writing Persuation Papers: Thesis Statement"—Department of Linquistics, Brigham Young University—Ashton, Stephanie—Jan. 24, 1998.

"Teaching Writing Without Holding the Mayo"—The National Counsel of Teachers of English—Ousley, Candace—.

"Hamburger Out a Paragraph"—Power Writing—Moore, Terri & Priscilla Nicholson—Dec. 3, 1998.

"The Hamburger Model for Persuasive Writing" Underrunners by Margaret Mahy Center for Gifted Education School of Education The College of William and Mary—2005.

"The Hamburger Model" 211 Writing Home—Mr. Jone's Web Site www.mrejones.com/hamburger.html—Aug. 24, 2007.

"A Cool Hamburger Joint"—The Soul Food Cafe (A non-profit educational site)—Blakely, Heather (Feb. 2000).

"Introducing the Hamburger Model for Persuasive Writing"—Web Lesson Format—Chambers, Bonnie—Mar. 8, 1999.

"The Hamburger Essay" GED 2002 Teachers Handbook of Lessons Plans Chris DeMitchele—Lee County—2002.

"The Hamburger Paragraph"—Georgian Forest Maryland School Website—Diana Kieval—Feb. 5, 1999.

"How to Write a Hamburger Paragraph"—Mr. Klingensmith's Online Help Guide—Michael Klingensmith—1996-2003.

"Hamburger Harley"—World of Hamburgers, Inc.—Long, Jen—1996-2005.

"Turn Studentys with Leanring Disabilities into Writers"—Council for Exceptional Children, The Voice and Vision of Special Education—Terri, Bonnie—Nov. 10, 2005.

"Hamburger for Pursuasive Writing"—Persuasion: A language arts unit for high-ability learners (1998). Center for Gifted Education. The College of William and Mary College. Dubuque, Iowa: Kendall Hunt Publishing. pp. 68, 300-VanTessell-Baska, K.—J. Hooper & P. Daley Gifted Conference.

"Teaching Ideas"—Molliue Perez—Jun. 2005.

"Big Mac Paragraph Format"—www.myworksheet.com.

* cited by examiner

Fig. 12A
Fig. 12B
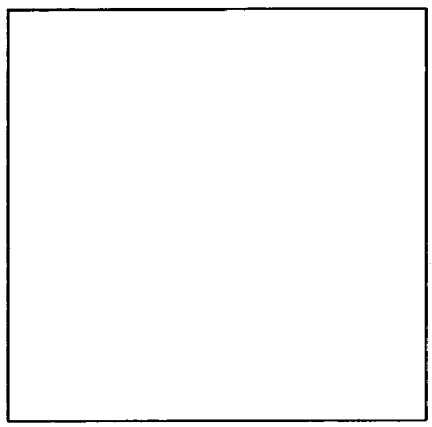

Fig. 37

(CONTENTS)  K

(CONTENTS)    1

(CONTENTS)   2

(CONTENTS) 3

(CONTENTS) 4

(CONTENTS)    5

Fig. 1
Fig. 2
Fig. 3
Fig. 4
Fig. 5
Fig. 6
Fig. 7
Fig. 8
Fig. 9
Fig. 10
Fig. 11
Fig. 12

METHOD AND APPARATUSES FOR TEACHING A METACOGNITIVE APPROACH TO WRITING

FIELD OF INVENTION

The present invention relates to apparatuses and a method for teaching a metacognitive process for writing as it applies to the national guidelines and/or states academic content standards. More specifically, the present invention is manipulative apparatuses, which are multi-sensory and concrete, and a teaching method used for enhancing student's achievement in the process of recalling, interpreting, applying, analyzing, synthesizing, and/or judging as it pertains to all forms of writing and its conventions. The present invention may be used cross-curricular, with any age, and at any educational or instructional level.

BACKGROUND OF THE INVENTION

The operational definition of writing, presented by the National Council of Teachers of English, states that writing is the process of selecting, combining, arranging and developing ideas in effective sentences, paragraphs, and, often longer units of discourse. The process requires the writer to cope with a number of variables: (1) Method of development (narrating, explaining, describing, reporting and persuading); tone (from personal to quite formal); (2) form (from a limerick to a formal letter to a long research report); (3) purpose (from discovering and expressing personal feelings and values to conducting the impersonal "business" of everyday life); and (4) possible audiences (oneself, classmates, a teacher, "the world"). (Breland, Hunter M. and Robert J. Jones, (1982). Perceptions of Writing Skill (ETS RR NO. 8247). New York: College Board Publications.)

Leaning to write and to write increasingly well involves developing increasing skill and sensitivity in selecting from and combining these variables to shape particular messages. It also involves learning to conform to conventions of the printed language, appropriate to the age of the writer and to the form, purpose and tone of the message. Beyond the pragmatic purpose of shaping messages to others, writing can be a means of self-discovery, of finding out what we believe, know, and cannot find words or circumstances to say to others. Writing can be a deeply personal act of shaping our perception of the world and our relationships to people and things in that world. Thus, writing serves both public and personal needs of students, and it warrants the full, generous and continuing effort of all teachers. (Breland, Hunter M. and Robert J. Jones, (1982). Perceptions of Writing Skill (ETS RR NO. 8247). New York: College Board Publications.)

When we write we produce meaning for ourselves and others. Writing makes our thoughts visible, changing our thinking into print, allowing us to develop and extend our ideas, thus promoting "higher-order" thinking. In general, the underlying element of all literacy activities, in particular writing, requires, "thinking." "Since thinking is a crucial part of constructing meaning, classrooms that consistently foster meaning construction through reading and writing will produce better thinkers." (T. Tierney and Shanahan, 1991).

Research has shown that multi-sensory learning is one of the best methods for teaching thinking skills. It is "graphical ways of working with ideas and presenting information." (Inspiration 2000) to teach students to clarify their thinking, and process, organize and prioritize new information. Multi-sensory apparatuses and methods of teaching aid students to clarify thinking, reinforce understanding, integrate new knowledge and identify misconceptions.

The actual task of writing causes anxiety and discomfort in a great number of adults, including teachers. They may have never been taught a workable approach to writing or may have been criticized for their efforts. This same discomfort in writing is found in many students. The "writing process," a sequence of activities (prewriting, drafting, revision, editing, publishing), has been used by teachers in the classroom to teach writing for the past twenty-five years. Accounting for the individual differences in students, teachers have used different modes of writing (shared, guided or cooperative/collaborative, independent) to enhance process writing. Many students, however, continue to struggle with getting their thoughts on paper in an organized, coherent fashion. Reference: (Pennsylvania Literacy Framework 2000).

Recent research and practice have indicated that focusing on what students do as writers, rather than on theory and grammar, results in more effective written communication. Unfortunately, instruction in the writing process often prescribes a simple linear formula: from prewriting (generating and organizing ideas) to writing to postwriting (revising and editing). In reality, all three stages in the process are interactive and recursive. Composing involves a variety of plans and subprocesses that are brought to bear as they are needed (Hillocks, 1986).

Learning to write well is important for all American students. Even though students have varied backgrounds and experiences, the expectation for high performance in writing applies to all. Language arts instruction would welcome an approach to teaching writing that not only teaches how to do the writing process but also how to think through the writing process using multi-sensory apparatuses.

Over the past decade, most states in the continental United States have adopted academic standards which are based on national guidelines in various content areas. These guidelines are the foundation for the curriculum in schools and, in addition, students must reach proficiency in these standards in order to graduate from high school. The Pennsylvania Department of Education (PDE) 22 Pennsylvania Code, Chapter 4 Regulation-Reading, Writing, Speaking and Listening Standards states that the standards provide the targets for instruction and student learning essential for success in all academic areas. The Pennsylvania Academic Standards were designated for all school districts in the commonwealth for Grades 3, 5, 8, and 11 in the areas of language arts and math. Specifically, the standards include 1.1G: Learning to Read Independently; 1.2C: Reading Critically in all Content Areas; 1.3 A,B,F: Reading, Analyzing, and Interpreting Literature; 1.4 A,B,C: Types of Writing; 1.5 A,B,C,D,E,FG: Quality of Writing. The Pennsylvania Department of Education has mandated academic standards in the content areas of reading (written response to literature) and in writing but has provided only abstract guidelines for student achievement in these areas. The Pennsylvania Department of Education provides no concrete, multi-sensory apparatuses and methodology for teaching a metacognitive approach to writing.

The Pennsylvania Department of Education has mandated state school districts (e.g. Coatesville Area School District (CASD)) use the academic standards in the content areas of reading (written response to literature) and in writing. The Pennsylvania Academic Standards were designated for all school districts in the Commonwealth for Grades 3, 5, 8, and 11 in the areas of language arts and math. It was the responsibility of the CASD standards committee, comprised of teachers in the district, to develop the content standards at all grade levels (K-11) other than those designated by the state academic standards. Coatesville Area School District provides no concrete, multi-sensory apparatuses and methodology for teaching a metacognitive approach to writing.

This problem is reflected also in various publications that attempt to give concrete, multi-sensory tools for teaching writing. "Hamburger Writing", by Laura Small, is described in the *Pennsylvania Parent Connection Kit*. According to Small, "The Hamburger Writing Strategy uses the hamburger as a visual to help students with the writing process. This method is appropriate for use with students in grades one to six." This strategy emphasizes the parts of a paragraph and the essential characteristics of a paragraph but it is a limited, one dimensional abstract and provides no concrete, multi-sensory apparatuses and methodology for teaching a metacognitive approach to writing.

A number of existing works (see references) regarding the "Hamburger Writing Strategy" were located via the internet. Again they are all limited to a one-dimensional abstract whose essential purpose is to enhance the student's progress during the writing process. None of the existing works provided concrete, multi-sensory apparatuses and methodology for teaching a metacognitive approach to writing.

Educational methods which utilize interactive, colored, language art manipulatives are known in the prior art. U.S. Pat. No. 4,907,971 by Ruth L. Tucker describes a method which syntactically categorizes the components of the English language sentences and a schema for showing categories for which any sentence could belong. Morgan D. Benedict, in U.S. Pat. No. 5,013,245, describes a system which depicts a series of interconnecting geometric shapes to represent parts of speech comprising simple sentence patterns. U.S. Pat. No. 5,738,523 by Susan Wagoner describes color-coded manipulatives which identify paragraph themes, represent key sentences within a paragraph and are so ordered as to clearly outline proper sentence sequencing.

The known prior art is grounded in focus on grammatical construction of sentences, paragraphs, and/or stories. To the applicants' knowledge, no method and aids therefore exist which address the use of multi-sensory, concrete apparatuses and methodology for teaching a metacognitive approach to writing.

SUMMARY OF THE INVENTION

A principal object of the present invention is provision of a metaphoric model for teaching a metacognitive approach to the process of writing. Another object is to provide apparatus and methods that aid students in preparing for national and state academic content exams. Another object of the present invention is to provide aids for visual learning and to process information in color and form. The invention assists students in auditory learning and kinesthetic learning, i.e., processing information by hands-on activities.

The apparatuses used to assist learning are three-dimensional and can be used at any age for educational or instructional level. It aids in the process of recalling during the activity of writing. It provides word associations for each manipulative, aids in the process of interpreting during the activity of writing, and aids in the process of applying during the activity of writing. Furthermore, it aids in the processes of synthesizing and judging during the activity of writing. The invention pertains to all forms/types of writing and the conventions of writing. It is cross-curricular and diagnostic.

The invention is useable by students, teachers and parents. It is a device for collaboration; it is academic, content standard aligned; it is a multi-intelligence too and it provides for higher order thinking skills.

It is sequential and provides a scaffolding tool that builds from basic components to more complex. It is group differentiated, easily handled, quickly distributed and personally packaged.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

DESCRIPTION OF THE DRAWINGS

Figures 1, 2, 3, 4, 11, 12, 38:
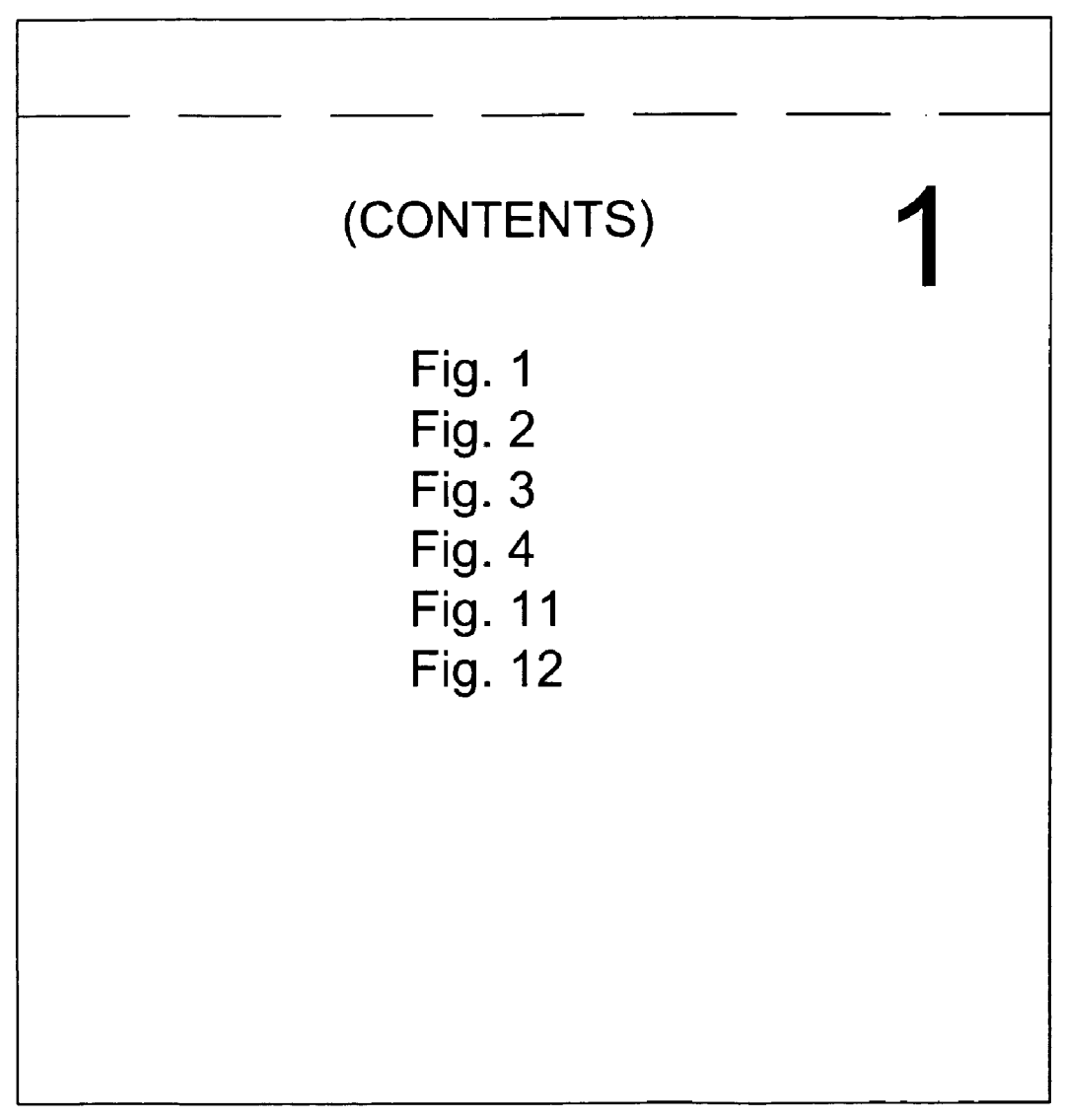

FIG. 12A illustrates a top plan view of cheese which represents a check for conventions in a paragraph/story (yellow craft foam);

FIG. 12B illustrates a side perspective view of cheese in FIG. 12A (yellow craft foam);

Figures 1, 2, 3, 11, 37:
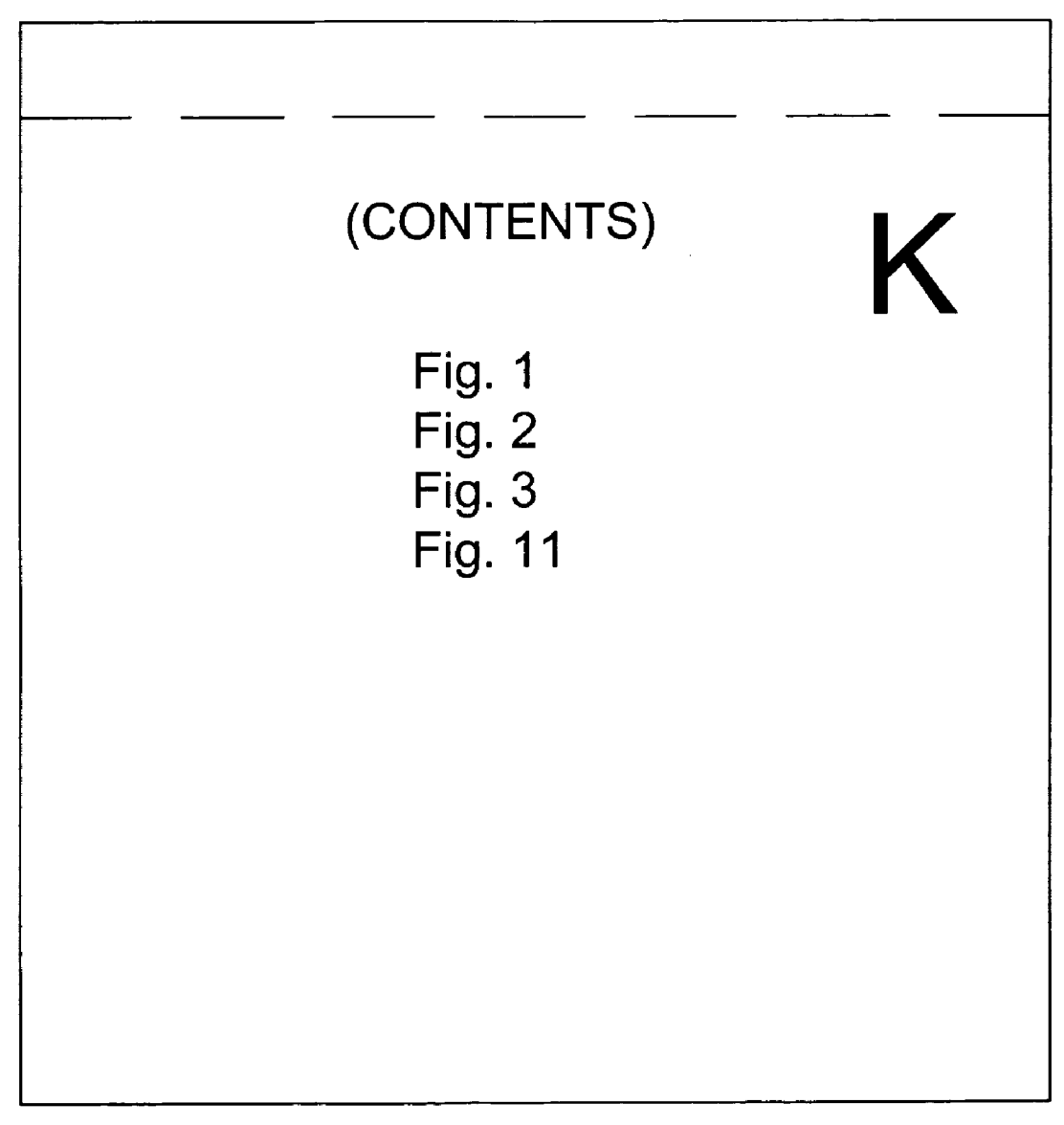

FIG. 37 illustrates a bag and its contents for a Grade Kindergarten/Level-Beginner;

FIG. 38 illustrates a bag and its contents for a Grade 1/Level-1;

FIG. 39 illustrates a bag and its contents for Grade 2/Level-2;

FIG. 40 illustrates a bag and its contents for Grade 3/Level-3;

FIG. 41 illustrates a bag and its contents for Grade 4/Level-4; and

FIG. 42 illustrates a bag and its contents for Grade 5/Level-5.

DETAILED DESCRIPTION OF INVENTION

Figure 1A:
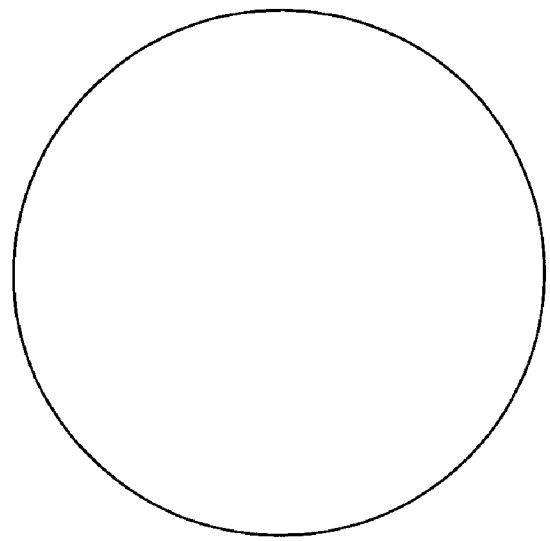
FIG. 1A illustrates a top plan view of a top bun which represents a topic sentence of a paragraph/story (tan and beige craft foam).
Figure 1B:
FIG. 1B illustrates a side perspective of a top bun in FIG. 1A (tan and beige craft foam)
Figure 2A:
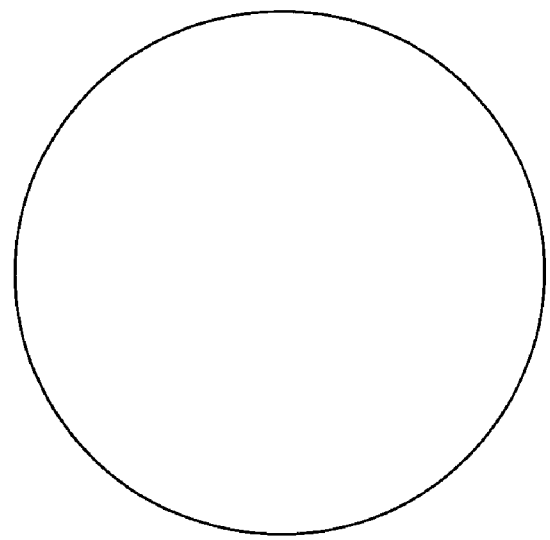
FIG. 2A illustrates a top plan view of a bottom bun which represents a closing sentence of a paragraph/story (tan and beige craft foam)
Figure 2B:
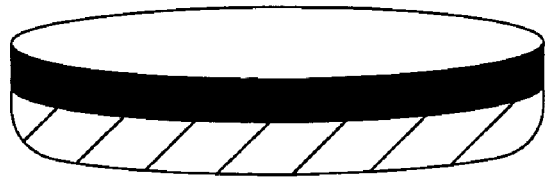
FIG. 2B illustrates a side perspective view of a bottom bun in FIG. 2A (tan and beige craft foam)
Figure 3A:
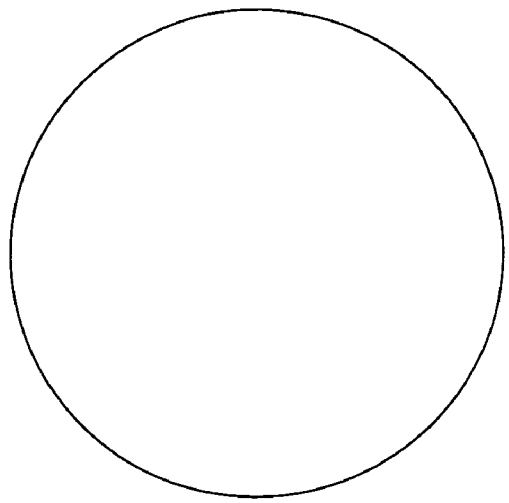
FIG. 3A illustrates a top plan view of meat which represents a number of detailed sentences in a paragraph/story (brown craft foam)
Figure 3B:
FIG. 3B illustrates a side perspective view of meat in FIG. 3A (brown craft foam)
Figure 4A:
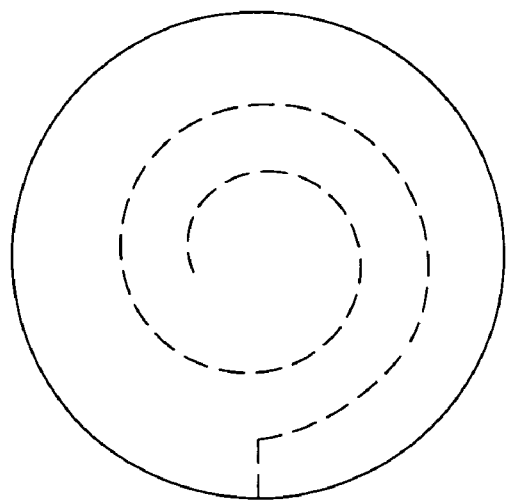
FIG. 4A illustrates a top plan view of an onion which represents an opinion in a paragraph/story (spiral cut white craft foam)
Figure 4B:
FIG. 4B illustrates a side perspective view of an onion in FIG. 4A (spiral cut white craft foam)
Figure 5A:
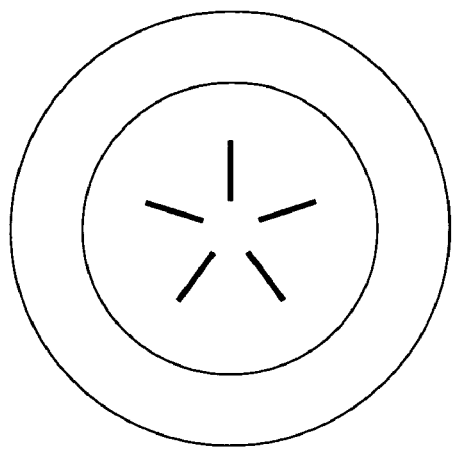
FIG. 5A illustrates a top plan view of two tomatoes which represents checking for the total package in a paragraph/story (red craft foam)
Figure 5B:
FIG. 5B illustrates a side perspective view of two tomatoes in FIG. 5A (red craft foam)
Figure 5B:
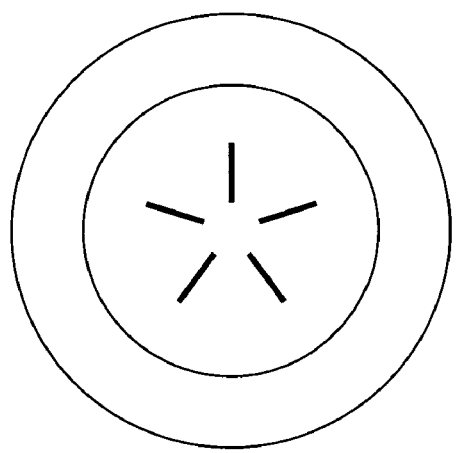
Figure 5B:

The features and elements of a well-written paragraph are represented by tangible apparatuses illustrated in the drawings. Those apparatuses comprise textured representations of objects well known to students, for example, a hamburger and all the fixings that are sold at various fast food restaurants. Most students are very familiar with elements of a hamburger they see extensive advertised on television and consume on a regular basis.

Figure 6A:
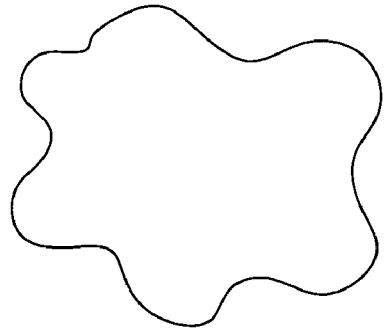
FIG. 6A illustrates a top plan view of catsup which represents a character in a paragraph/story (red craft foam)
Figure 6B:
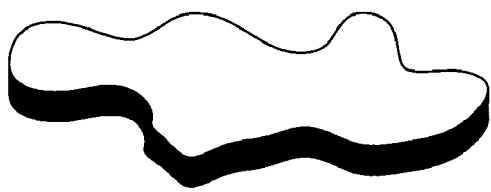
FIG. 6B illustrates a side perspective view of catsup in FIG. 6A (red craft foam)
Figure 7A:
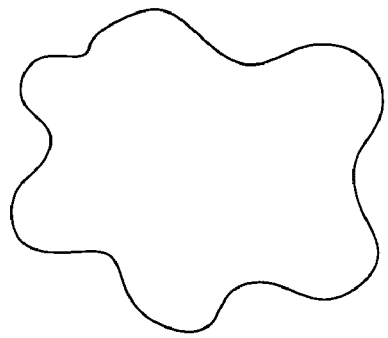
FIG. 7A illustrates a top plan view of mustard which represents metaphors, similes, alliteration and other literary devices in a paragraph/story (yellow craft foam)
Figure 7B:
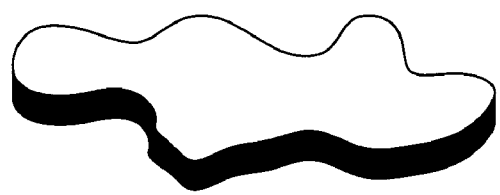
FIG. 7B illustrates a side perspective view of mustard in FIG. 7A (yellow craft foam)
Figure 8A:
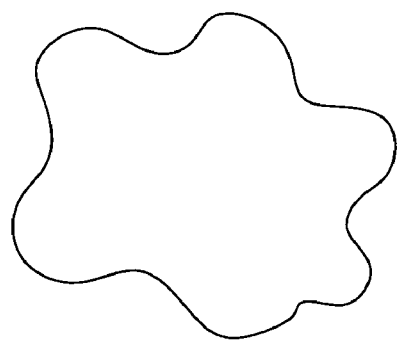
FIG. 8A illustrates a top plan view of sauce which represents strong verbs and words in a paragraph/story (pink craft foam)
Figure 8B:
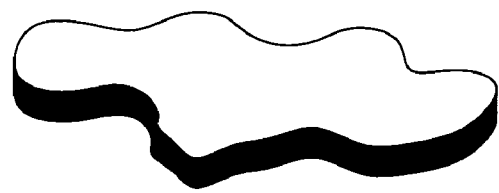
FIG. 8B illustrates a side perspective view of sauce in FIG. 8A (pink craft foam)
Figure 9A:
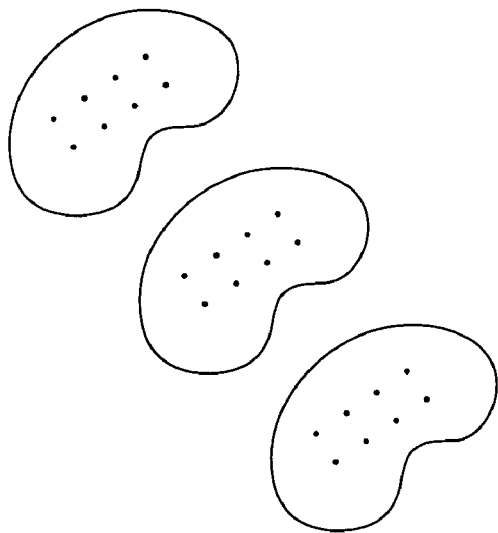
FIG. 9A illustrates a top plan view of three pickles which represent personal connections, what you know about life, people or situation, in a paragraph/story (dark green craft foam)
Figure 9B:
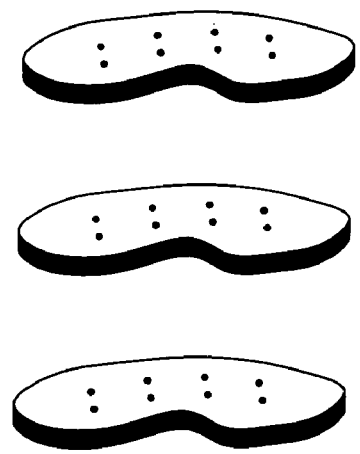
FIG. 9B illustrates a side perspective view of pickles in FIG. 9A (dark green craft foam)
Figure 10A:
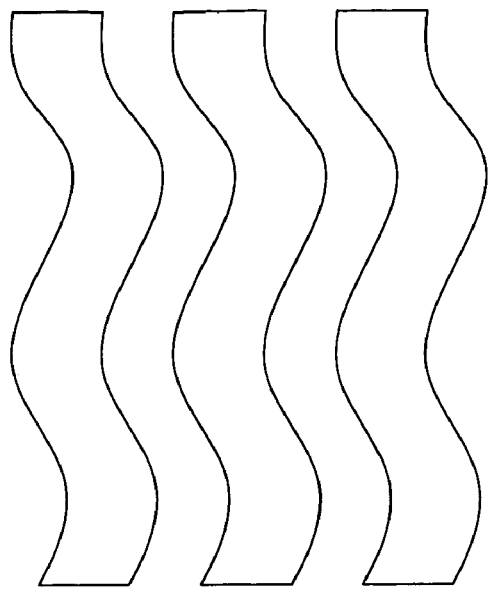
FIG. 10A illustrates a top plan view of three pieces of bacon which represents transition words in a paragraph/story (brown craft foam)
Figure 10B:
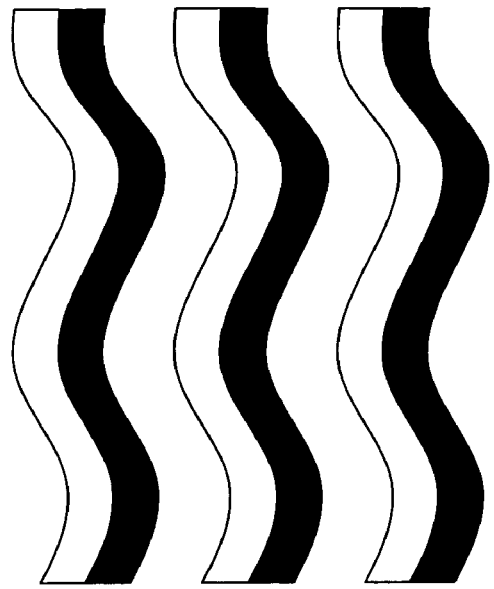
FIG. 10B illustrates a side perspective view of three pieces of bacon FIG. 10A (brown craft foam)
Figure 11A:
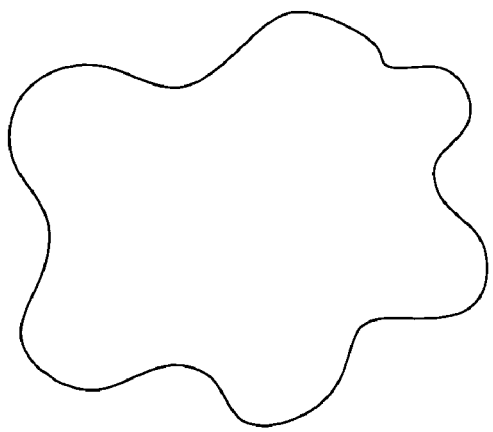
FIG. 11A illustrates a top plan view of lettuce which represents lots of detail in a paragraph/story (green craft foam)
Figure 11B:
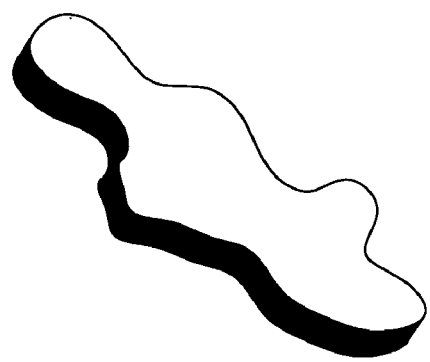
FIG. 11B illustrates a side perspective view of lettuce in FIG. 11A (green craft foam)
Figure 13:
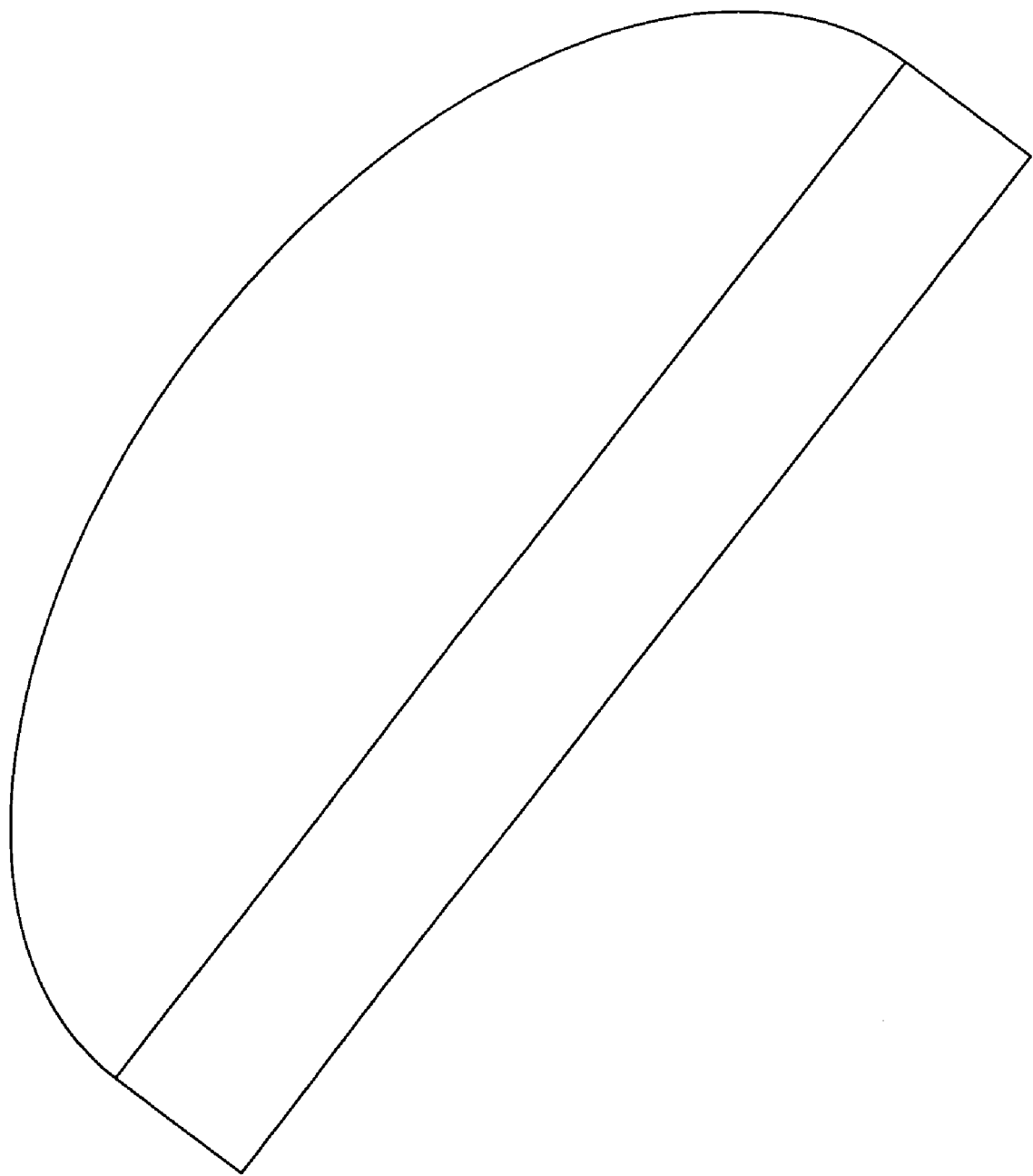
FIG. 13 illustrates a top plan view of a wall model of a top bun which represents a topic sentence of a paragraph/story (tan and beige craft foam)
Figure 14:
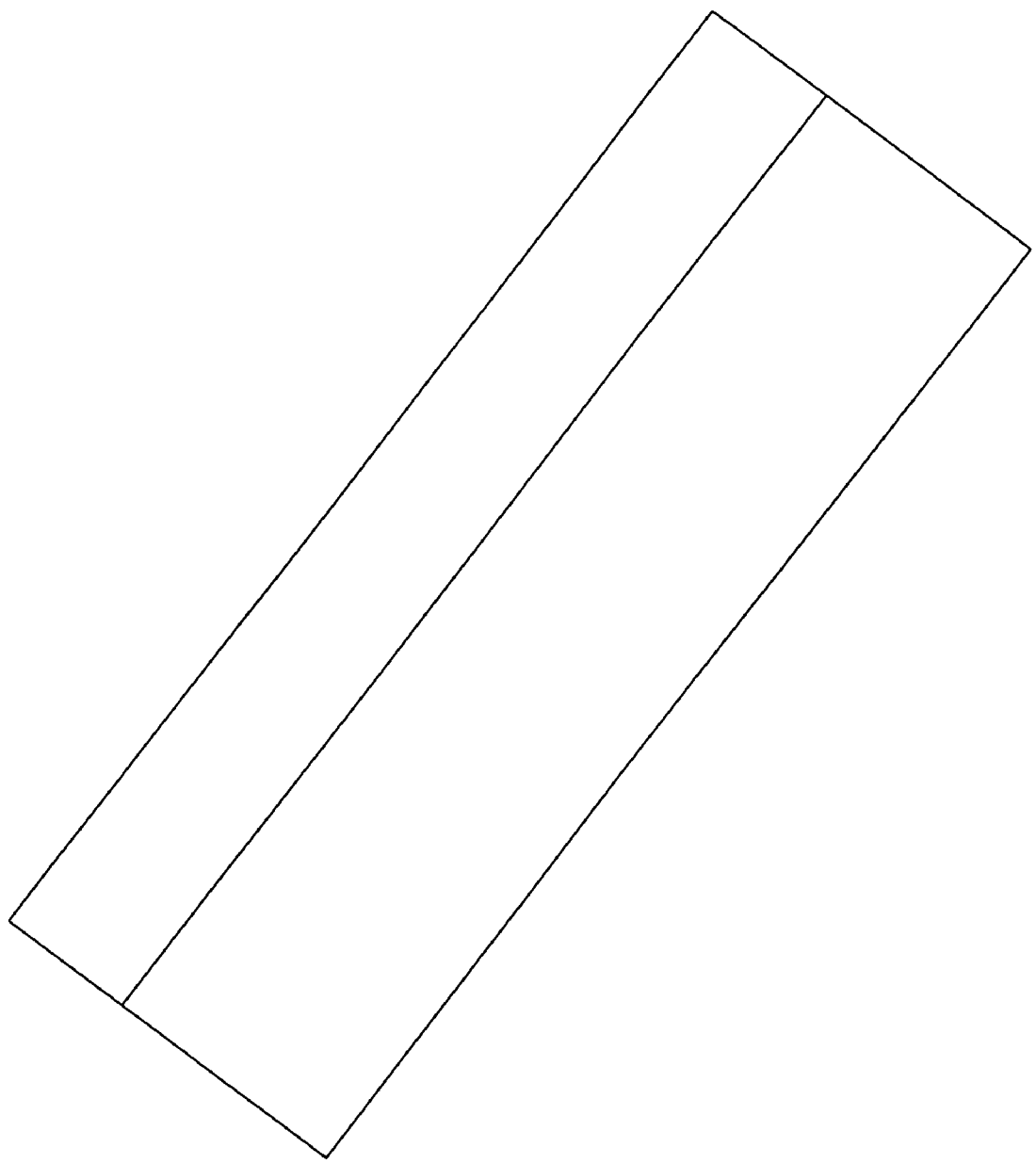
FIG. 14 illustrates a top plan view of a wall model of a bottom bun which represents a closing sentence of a paragraph/story (tan and beige craft foam)
Figure 15:
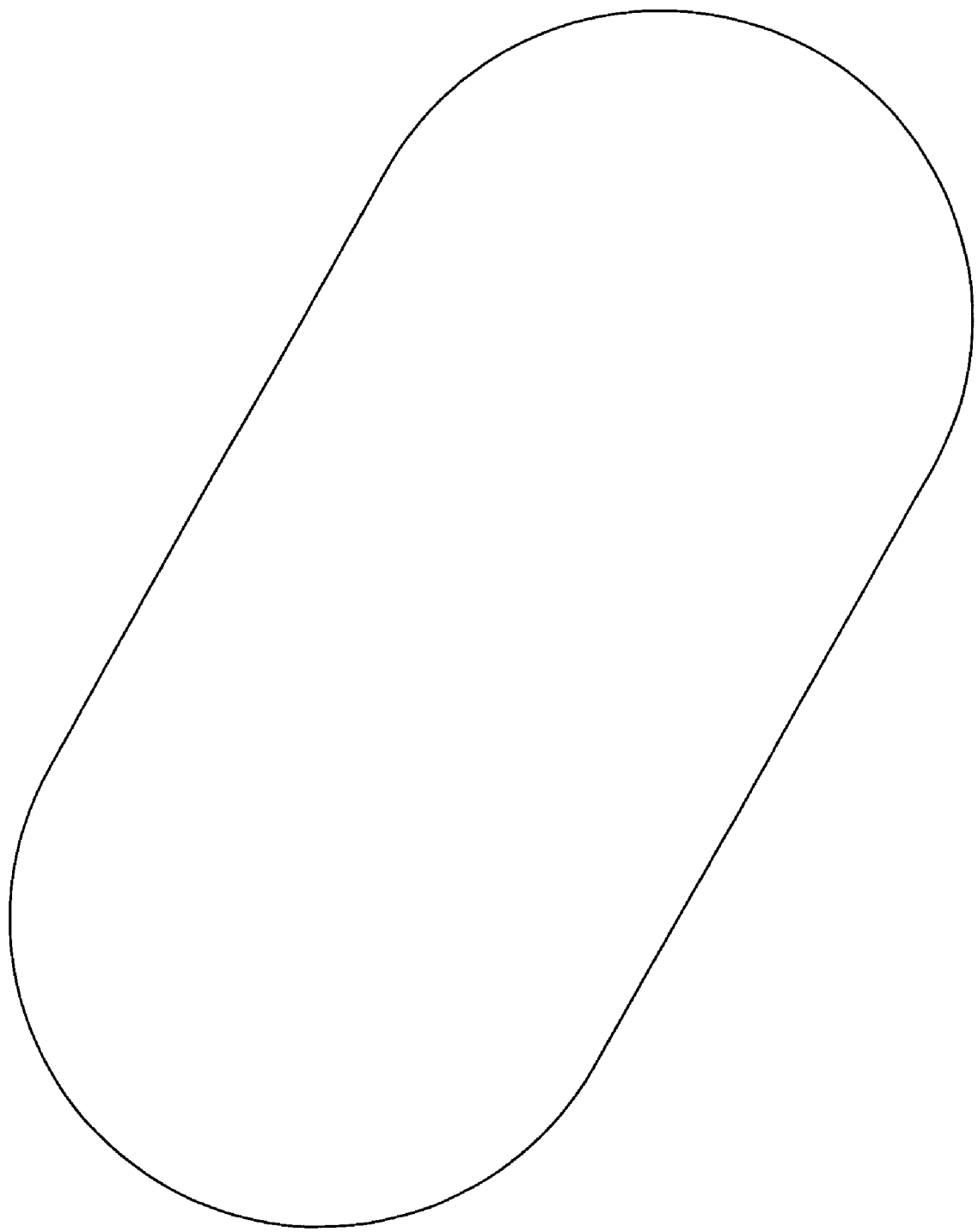
FIG. 15 illustrates a top plan view of a wall model of meat which represents a number of detailed sentences in a paragraph/story (brown craft foam)
Figure 16:
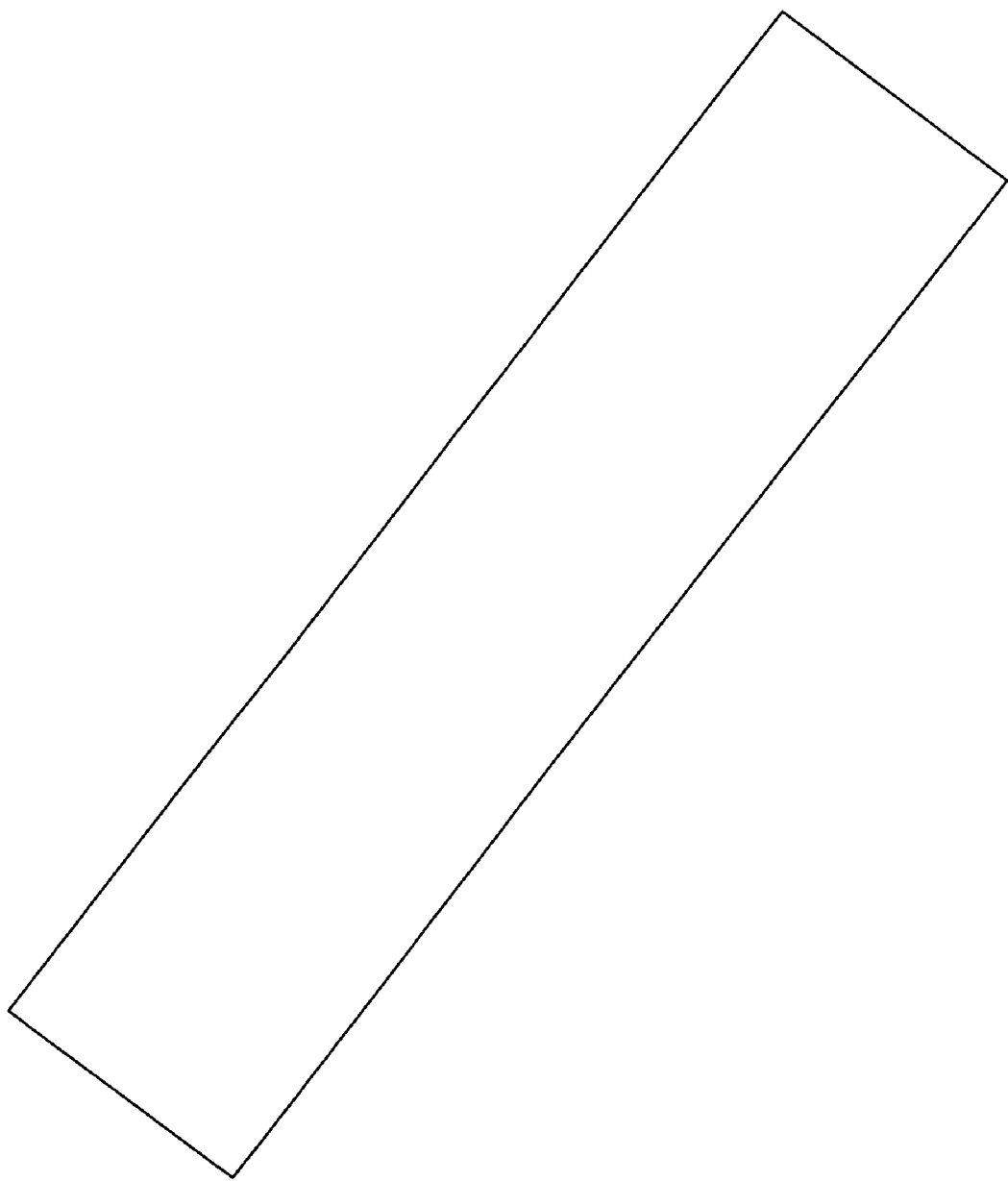
FIG. 16 illustrates a top plan view of a wall model of cheese which represents a check for conventions in a paragraph/story (yellow craft foam)
Figure 17:
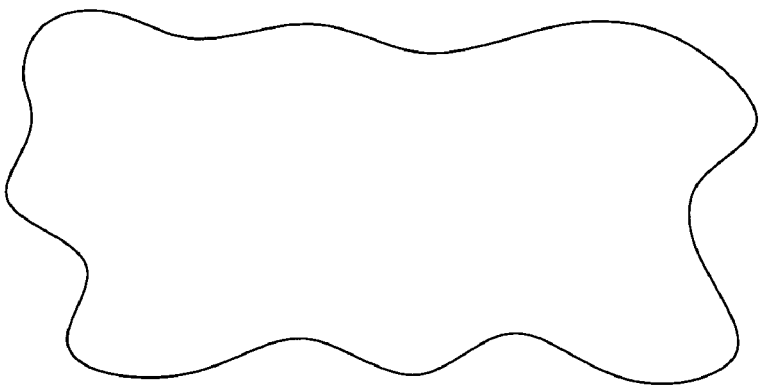
FIG. 17 illustrates a top plan view of a wall model of catsup which represents a character in a paragraph/story (red craft foam)
Figure 18:
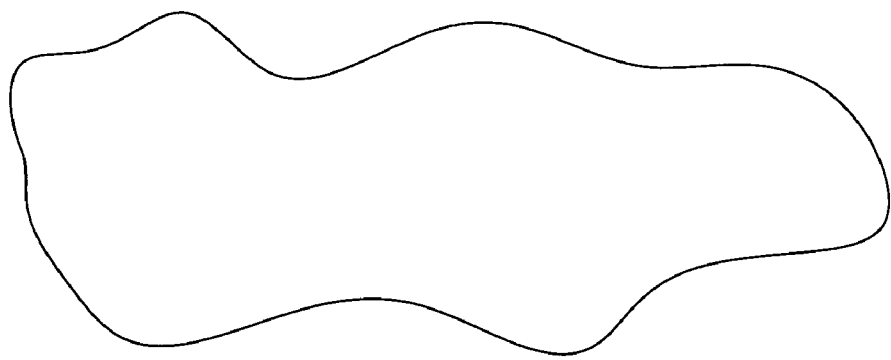
FIG. 18 illustrates a top plan view of a wall model of mustard which represents metaphors, similes, alliteration and other literary devices in a paragraph/story (yellow craft foam)
Figure 19:
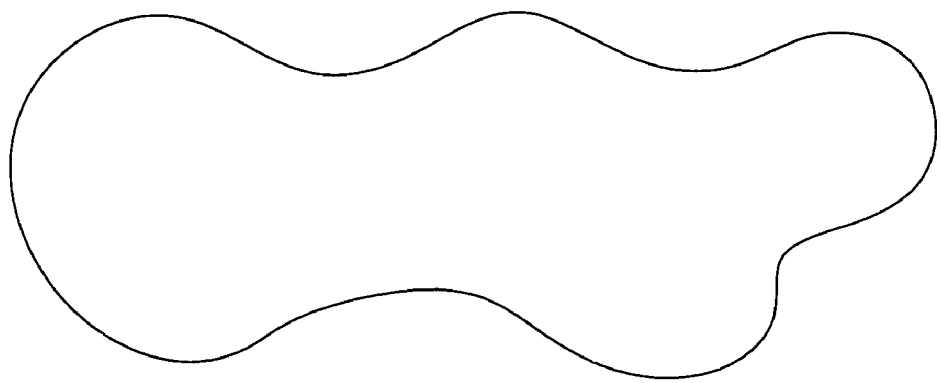
FIG. 19 illustrates a top plan view of a wall model of sauce which represents strong verbs and words in a paragraph/story (pink craft foam)
Figure 20:
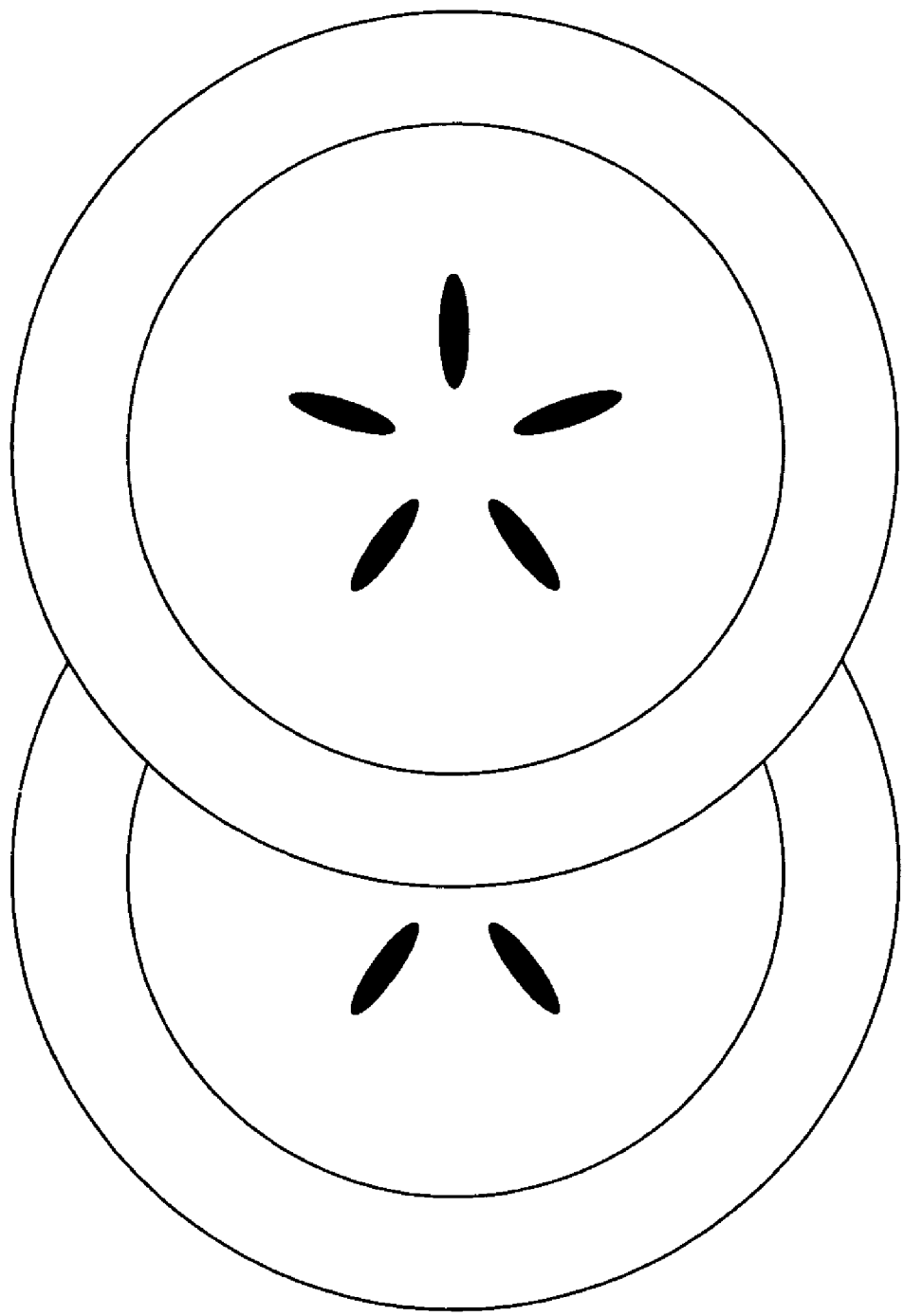
FIG. 20 illustrates a top plan view of a wall model of two tomatoes which represents checking for the total package in a paragraph/story (red craft foam)
Figure 21:
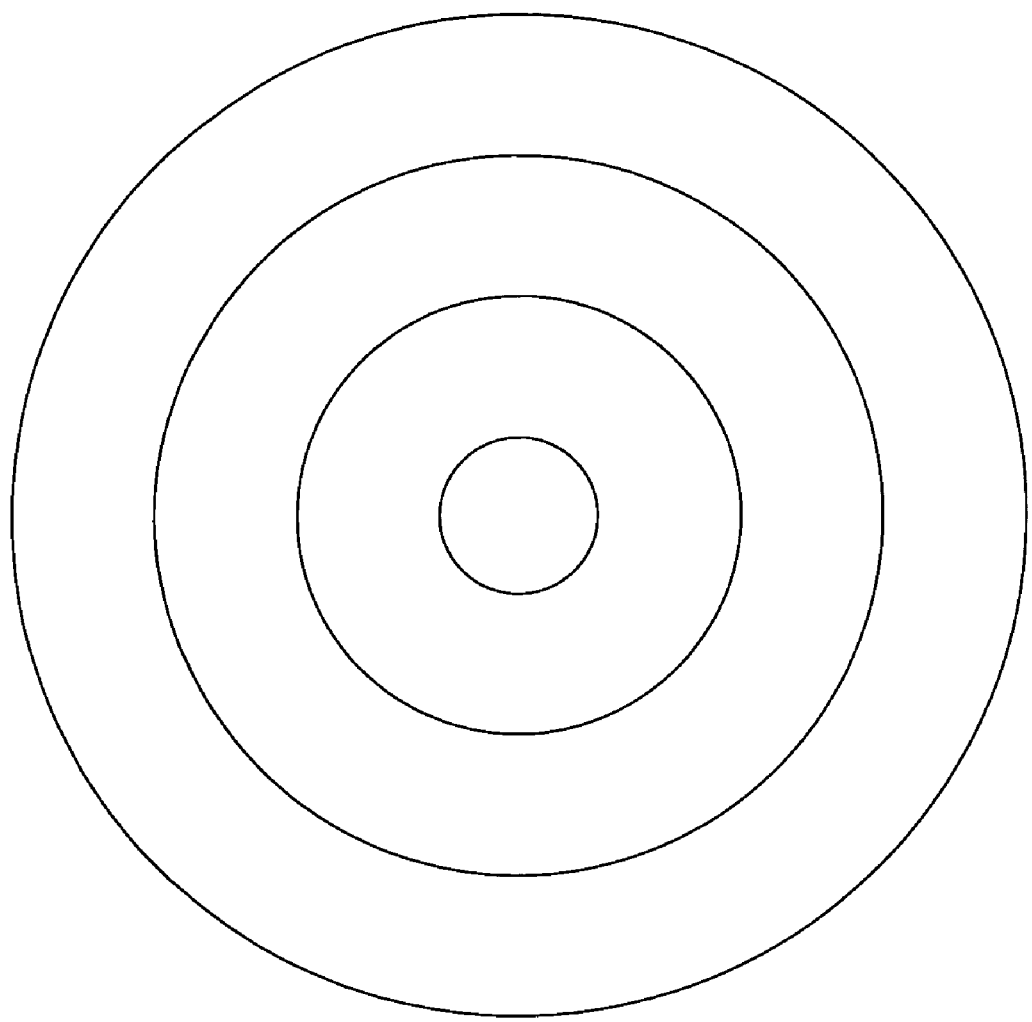
FIG. 21 illustrates a top plan view of a wall model of an onion which represents an opinion in a paragraph /story (white craft foam)
Figure 22:
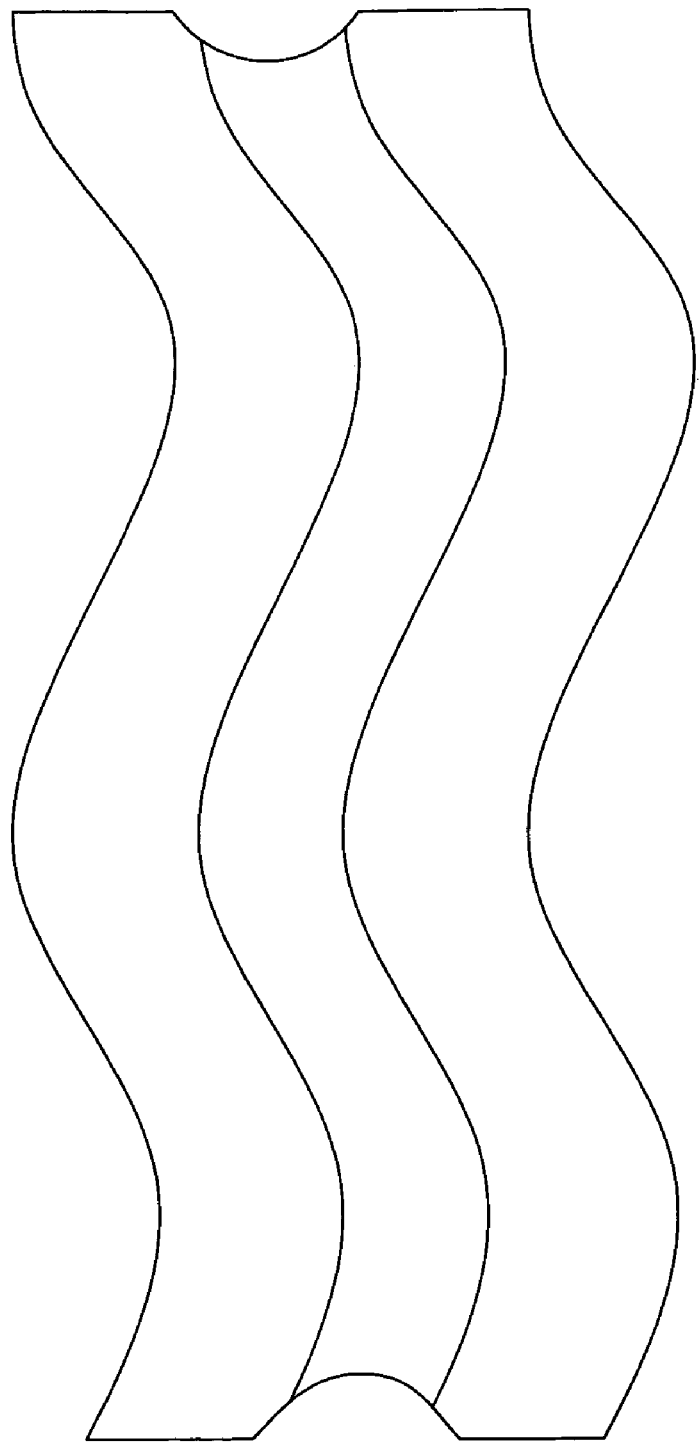
FIG. 22 illustrates a top plan view of a wall model of three pieces of bacon which represents transition words in a paragraph/story (brown craft foam)
Figure 23:
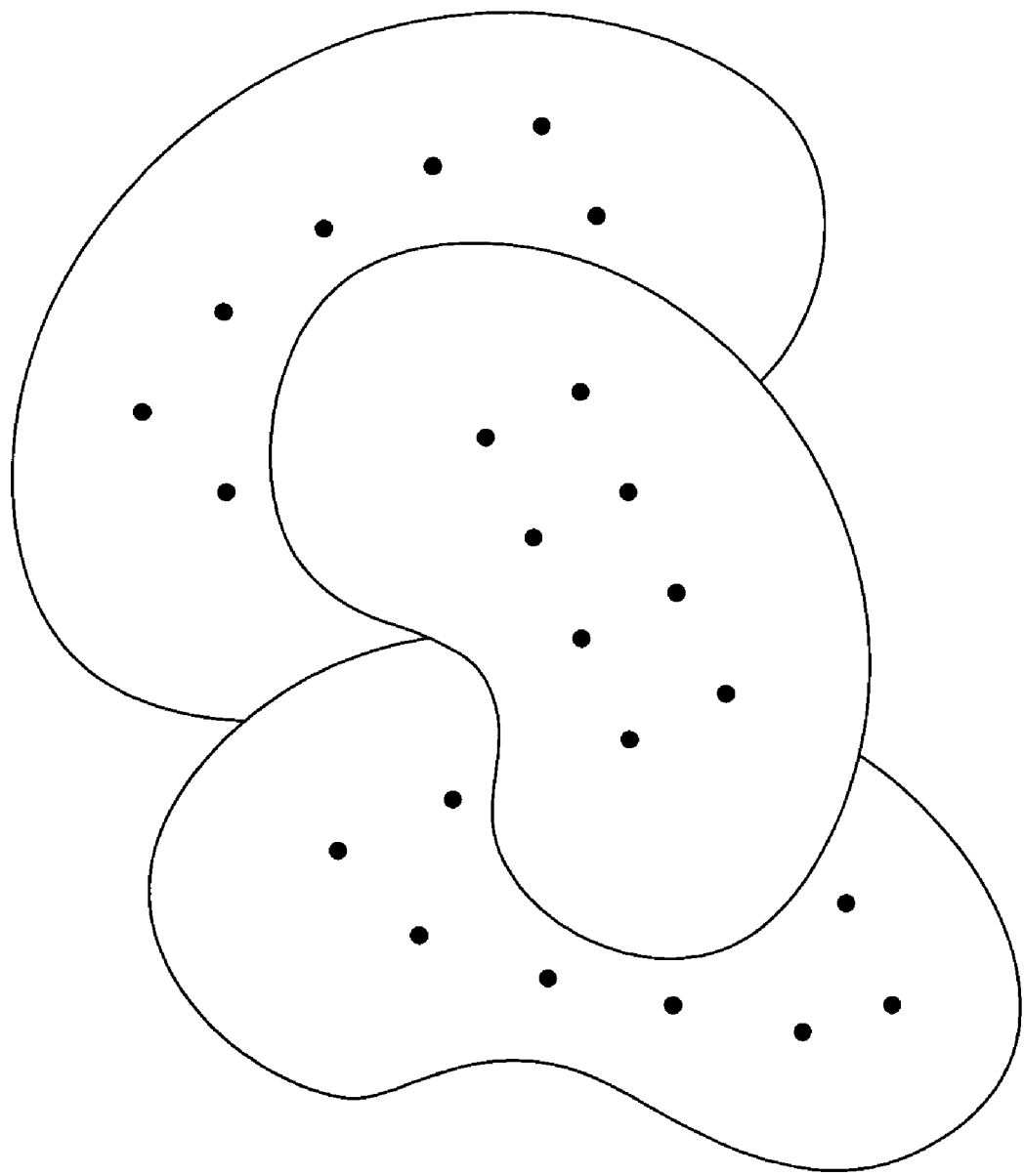
FIG. 23 illustrates a top plan view of a wall model of three pickles which represent personal connections, what you know about life, people or situation, in a paragraph/story (dark green craft foam)
Figure 24:
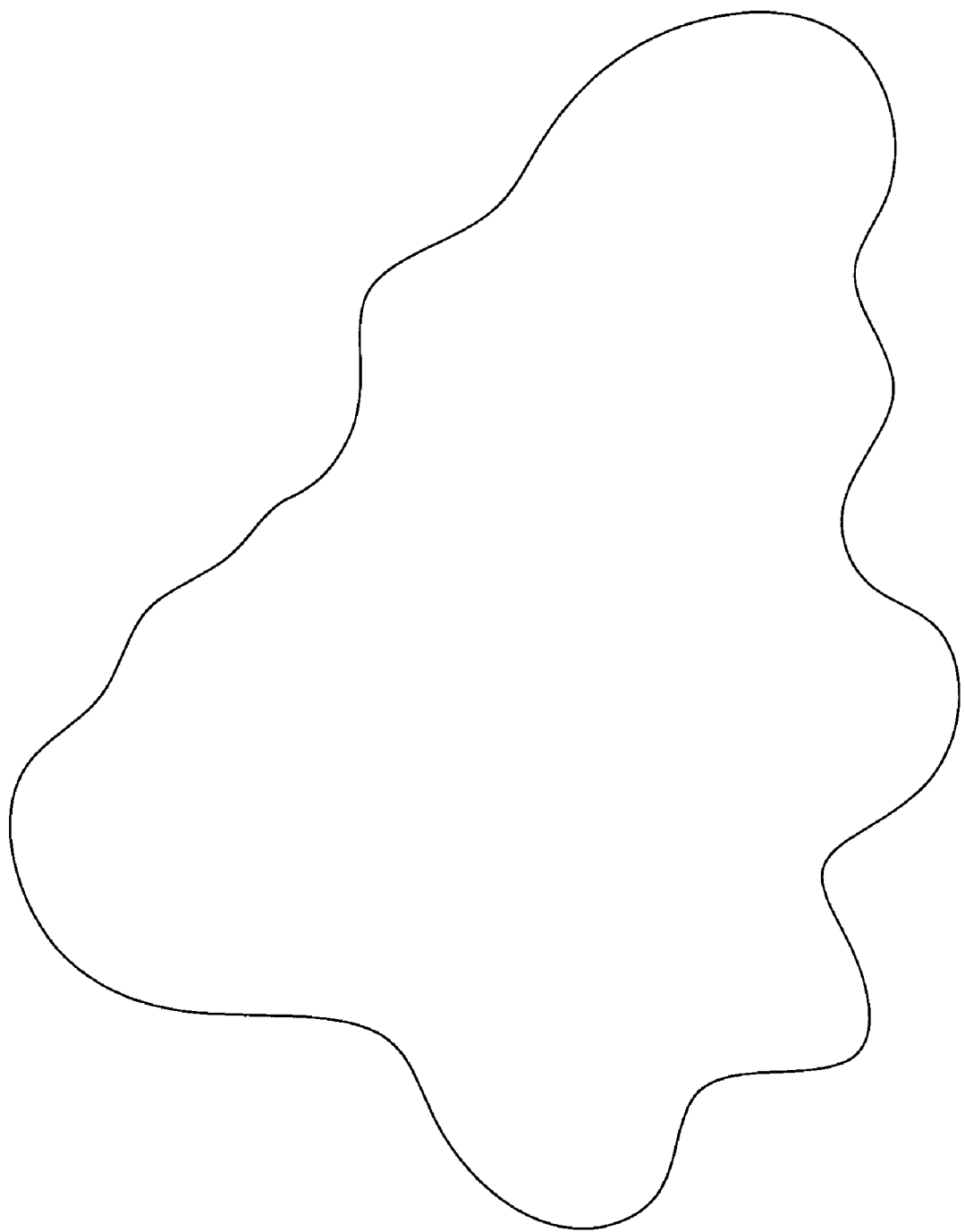
FIG. 24 illustrates a top plan view of a wall model of lettuce which represents lots of detail in a paragraph/story (green craft foam)
Figure 25A:
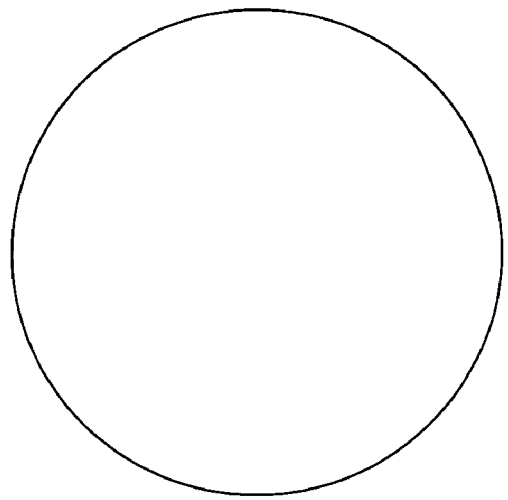
FIG. 25A illustrates a top plan view of a large scale pillow model of a top bun which represents a topic sentence of a paragraph/story (tan and beige fabric)
Figure 25B:
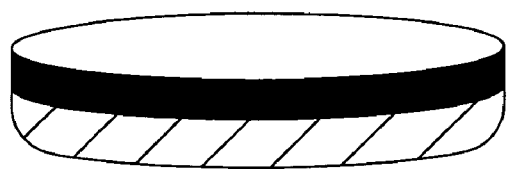
FIG. 25B illustrates a side perspective of a top bun in FIG. 25A (tan and beige fabric)
Figure 26A:
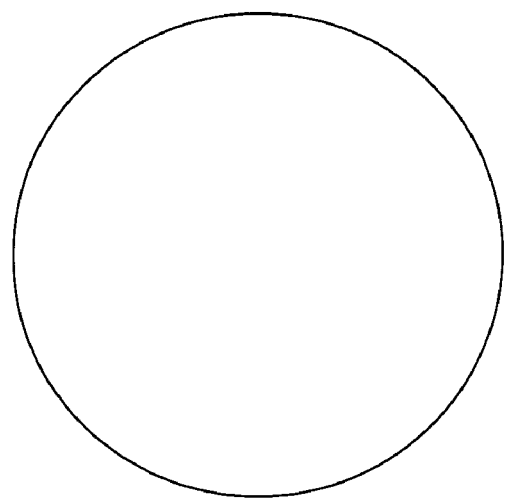
FIG. 26A illustrates a top plan view of a large scale pillow model of a bottom bun which represents a closing sentence of a paragraph/story (tan and beige fabric)
Figure 26B:
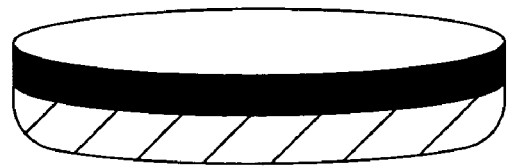
FIG. 26B illustrates a side perspective view of a bottom bun in FIG. 26A (tan and beige fabric)
Figure 27A:
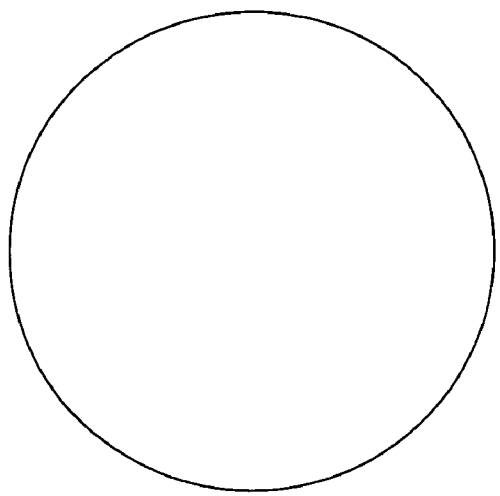
FIG. 27A illustrates a top plan view of a large scale pillow model of meat which represents a number of detailed sentences in a paragraph/story (brown fabric)
Figure 27B:
FIG. 27B illustrates a side perspective view of meat in FIG. 27A (brown fabric)
Figure 28A:
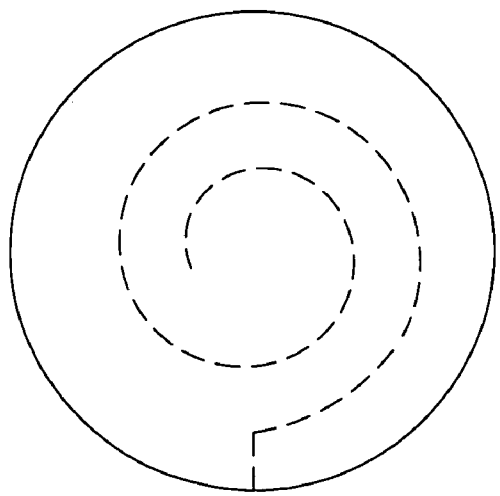
FIG. 28A illustrates a top plan view of a large scale pillow of an onion which represents an opinion in a paragraph/story (white fabric)
Figure 28B:
FIG. 28B illustrates a side perspective view of an onion in FIG. 28A (white fabric)
Figure 29A:
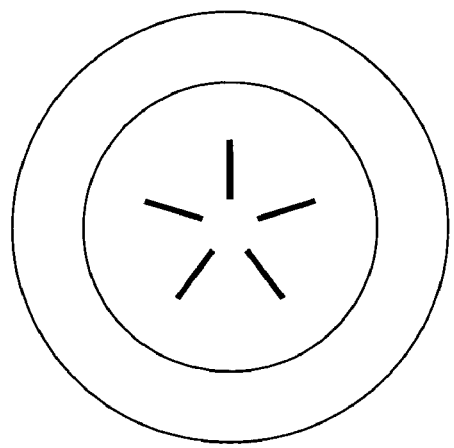
FIG. 29A illustrates a top plan view of a large scale pillow model of two tomatoes which represents checking for the total package in a paragraph/story (red fabric)
Figure 29B:
FIG. 29B illustrates a side perspective view of two tomatoes in FIG. 29A (red fabric)
Figure 30A:
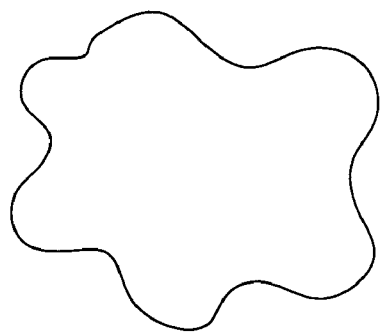
FIG. 30A illustrates a top plan view of a large scale pillow of catsup which represents a character in a paragraph/story (red fabric)
Figure 30B:
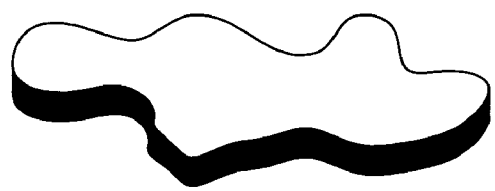
FIG. 30B illustrates a side perspective view of catsup in FIG. 30A (red fabric)
Figure 31A:
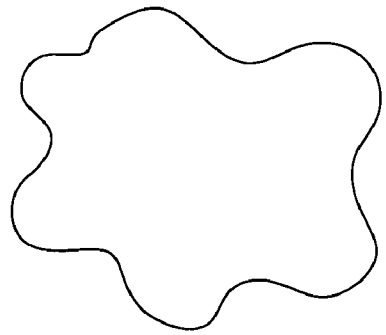
FIG. 31A illustrates a top plan view of a large scale pillow model of mustard which represents metaphors, similes, alliteration and other literary devices in a paragraph/story (yellow fabric)
Figure 31B:
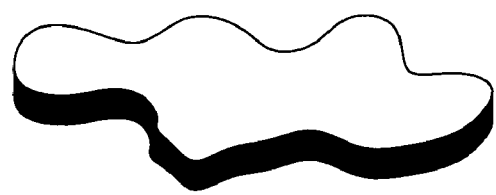
FIG. 31B illustrates a side perspective view of mustard in FIG. 31A (yellow fabric)
Figure 32A:
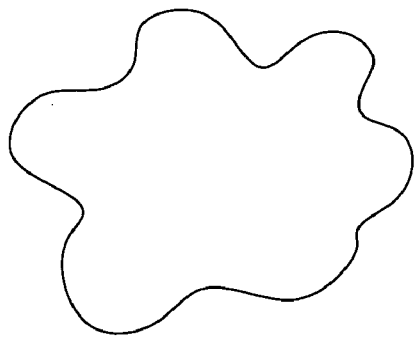
FIG. 32A illustrates a top plan view of a large scale pillow model of sauce which represents strong verbs and words in a paragraph/story (pink fabric)
Figure 32B:
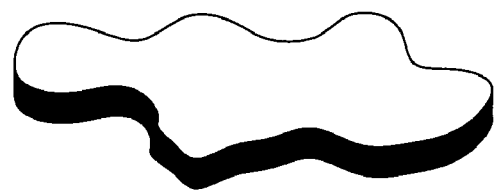
FIG. 32B illustrates a side perspective view of sauce in FIG. 32A (pink fabric)
Figure 33A:
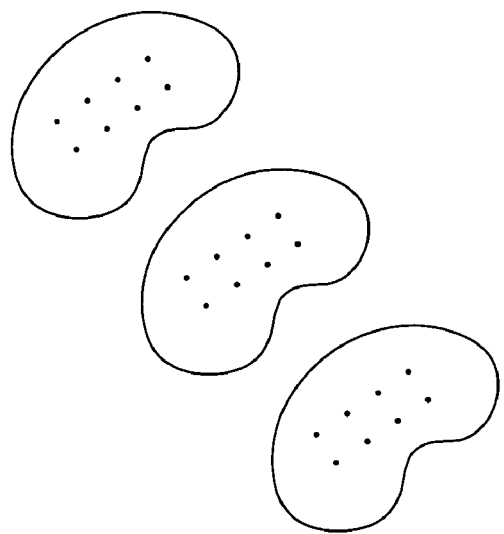
FIG. 33A illustrates a top plan view of a large scale pillow model of three pickles which represent personal connections, what you know about life, people or situation, in a paragraph/story (dark green fabric)
Figure 33B:
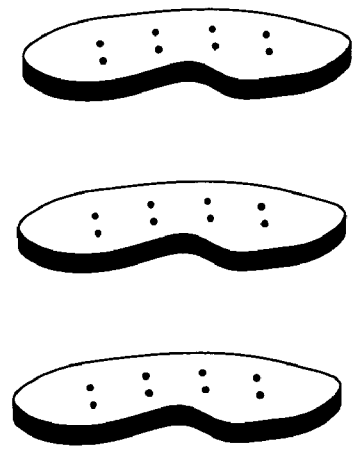
FIG. 33B illustrates a side perspective view of pickles in FIG. 33A (dark green fabric)
Figure 34A:
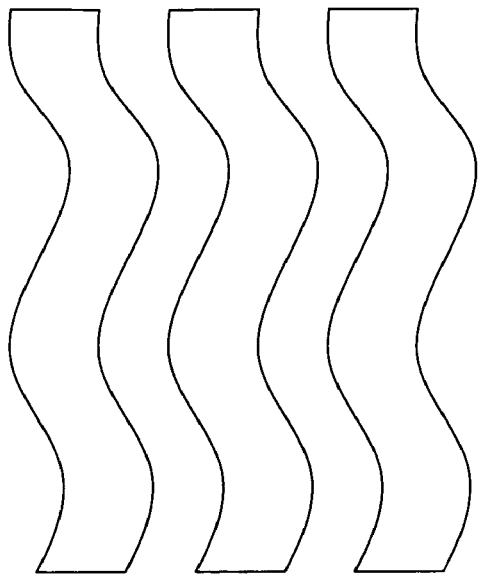
FIG. 34A illustrates a top plan view of a large scale pillow model of three pieces of bacon which represents transition words in a paragraph/story (brown fabric)
Figure 34B:
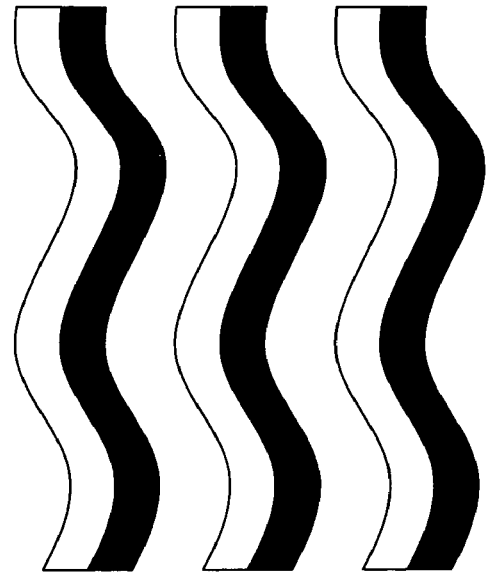
FIG. 34B illustrates a side perspective view of three pieces of bacon in FIG. 34A (brown fabric)
Figure 35A:
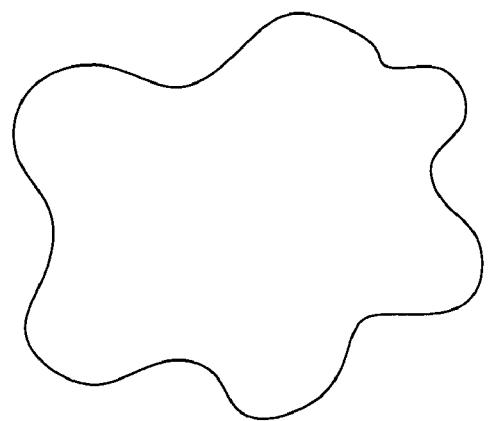
FIG. 35A illustrates a top plan view of a large scale pillow model of lettuce which represents lots of detail in a paragraph/story (green fabric)
Figure 35B:
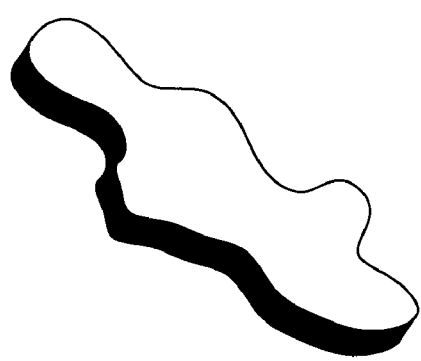
FIG. 35B illustrates a side perspective view of lettuce in FIG. 35A (green fabric)
Figures 36A, 36B:
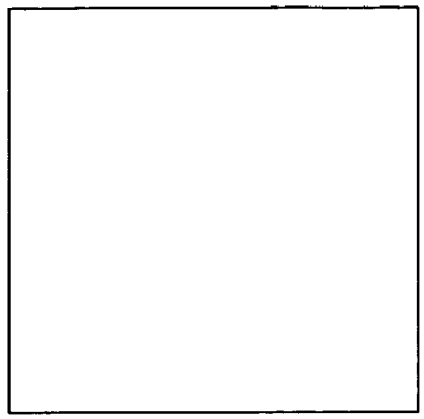
FIG. 36A illustrates a top plan view of a large scale pillow model of cheese which represents a check for conventions in a paragraph/story (yellow fabric)
FIG. 36B is a side perspective view of the pillow model of cheese shown in FIG. 36A.

Those elements typically are: (1) a top bun; (2) bottom bun; (3) the meat; (4) onion; (5) sliced tomatoes; (6) catsup; (7)

mustard; (8) sauce; (9) pickles; (10) bacon; (11) lettuce and (12) cheese. For purposes of this invention, each of these components of a hamburger can be visually represented by material that can be handled by the student, for example, colored craft foam. Thus, the top and bottom bun can be represented by tan and beige layers of craft foam cut to the approximate size of a hamburger bun. Catsup can be represented by an irregularly shaped piece of red craft foam (See FIG. 6). Pickles are represented by irregularly shaped green ovals with black dots in the center to generally represent the appearance of pickles. Each of these hamburger components is illustrated in the accompanying drawings and described in the Description of the Drawings.

Each of these replica hamburger parts has a role in helping a student to write a good paragraph. Each is associated with a particular aspect of paragraph writing as reflected in the following chart that lists the hamburger part, what portion of the paragraph structure it represents and its association or function relative to paragraph structure.

| Hamburger Part | Representative Portion of Paragraph Structure | Purpose or Association of Hamburger Part to Paragraph Structure |
|---|---|---|
| TOP BUN | Topic sentence | Sets the purpose or theme of paragraph |
| CATSUP | Characters-people or animals that act out the action in a story or other writing | Shows/provides comprehension of the story line |
| SAUCE | Strong verbs and words | Gives a visual image for the audience and adds sophistication to the writing |
| BACON | Transition Words - words used to make writing ideas blend together in a well organized fashion | Enhances comprehension-To make the piece of writing to sound more interesting and natural |
| TOMATO | Total package | Provides verification that the writing contains the necessary components for thorough understanding of the writing task |
| LETTUCE | Lots of Detail | Comprehension of the reader as well as the audience; Gives the audience a visual image |
| CHEESE | Check - conventions such as spelling, punctuation, capitalization, etc. Refer conventions for each grade level standard | Understanding, fluency, and publication |
| MEAT | Detail sentences in a paragraph | Detail sentences which include the essential characteristics of a paragraph; focus, style, and conventions |
| BOTTOM BUN | Closing sentence | Restates the purpose for writing |

It is readily apparent that the teaching of writing skills must be keyed to the developmental level of students. Thus, this invention is based on a gradual introduction of hamburger parts into the writing and reading curriculum in the elementary grades. Thus in kindergarten (K) level only a few hamburger parts would typically be used as teaching aids. More specifically, a teacher would likely use only the Top Bun, (topic sentence), Bottom Bun (closing sentence), meat (1 sentence) and possibly lettuce (story detail). In the first grade, the amount of meat would be increased to two sentences along with the addition of onion (opinion) and cheese (reminder to double check sentences). Each year, more structure and more parts would be added as reflected in the following chart:

| HAMBURGER PART | GRADES | | | | | |
|---|---|---|---|---|---|---|
| | K | 1 | 2 | 3 | 4 | 5 |
| TOP BUN | x | x | x | x | x | x |
| BOTTOM BUN | x | x | x | x | x | x |
| LETTUCE | x | x | x | x | x | x |
| MEAT (NO. OF SENTENCES) | 1 | 2 | 3 | 4 | 5 | 5 |
| ONION | | x | x | x | x | x |
| CHEESE | | x | x | x | x | x |
| CATSUP | | | x | x | x | x |
| BACON | | | x | x | x | x |
| PICKLES | | | | x | x | x |
| TOMATO | | | | x | x | x |
| SPECIAL SAUCE | | | | | x | x |
| MUSTARD | | | | | | x |

The above chart graphically illustrates the gradual increase in the number of hamburger parts used in each grade as the students' writing and reading skills increase. The amount of meat (sentences) increases each year peaking at five (5) sentences, which is representative of a typical well written paragraph. Higher order thinking skills like strong verbs and words (represented by Special Sauce) and metaphors (represented by Mustard) are introduced in the higher grade levels, as is consistent with the students advances in learning skills.

Hand held physical embodiments of each of the hamburger parts (See FIGS. 1-12) are organized by grade level and made available to students in small plastic resealable bags such as those sold in grocery stores under various trademarks such as Glad® Zipper Sandwich Bags Double-Lock Seal. This assembly and packaging of hamburger parts is graphically represented in FIGS. 37-42. These Figures illustrate the clear plastic bag with reclosable top (represented by a dotted line) and the hamburger parts that would be provided to a student at each grade level. For example, FIG. 37 illustrates a bag of hamburger parts for kindergarten students. The bag contains those parts illustrated in FIGS. 1, 2, 3 and 11 which are respectively, Top Bun, Bottom Bun, Meat and Lettuce. FIG. 38 illustrates a reclosable bag and its content for grade 1 students; FIG. 39 for grade 2 students; FIG. 40 for grade 3 students; FIG. 41 for grade 4 students and FIG. 42 for grade 5 students. The illustrated contents are those described in the chart set forth above.

The prepackaged hamburger parts remind students of what is expected in a well written paragraph structure. During or after writing a paragraph, the student will take the parts out of his or her reclosable bag and use them as a checklist of what should be in his/her writing. This reinforcement and checklist forces the student to think about what has been written and how it compares to established standards. This is particularly helpful in preparing students for standardized tests. Use of these tactile aids has been shown to significantly boost students' performance on standardized tests. Use of these tactile aids may significantly boost student's performance on standardized tests as they are introduced, modeled, and practiced sequentially. Collection and analysis of data is in the early stages.

Larger provisions of the replica hamburger parts can also be used as wall displays in the classroom (See FIGS. 13-24). The pillow is a large textured three-dimensional teacher and student aid primarily used during large group instruction. The pillow is used to: 1) introduce a new component of the hamburger; 2) model a specific hamburger part; 3) reinforce a student's use of a specific hamburger part; 4) provide visual stimulation for the student, and 5) enhance learning through multi-sensory games with the pillow parts.

This invention also pertains to reading skills. It can be incorporated into a reading lesson because of its metaphoric nature. The hamburger parts can be used orally as children respond to literature. It enhances a child's understanding of the author's use of the components of language as it is used in writing.

What is claimed is:

1. A method of teaching writing, comprising the steps of
providing a writing teaching aid for teaching writing which acts as a metaphoric model for works of writing, the writing teaching aid comprising an assembly of three-dimensional representations of components of a multi-component article familiar to students being taught, representing particular aspects of writing structure with the three-dimensional representations of components of the multi-component article, attempting to assemble the article using the three-dimensional representations of components that correspond to the writing structure used in a work of writing, and recalling, interpreting, applying, analyzing, synthesizing, and/or judging the work of writing by viewing what was assembled with the three-dimensional representations.

2. The method of claim 1, further including the step of
using the three-dimensional representations as a checklist to determine what should be in the work of writing.

3. The method of claim 1,
the components being parts of a hamburger.

4. The method of claim 1,
the three-dimensional representations being constructed from colored craft foam.

5. The method of claim 1,
the three-dimensional representations being pillows.

\* \* \* \* \*